(No Model.)

H. T. MARSHALL.
RUBBER SOLE FOR BOOTS OR SHOES.

No. 437,608. Patented Sept. 30, 1890.

Witnesses
Carrie E. Nichols

Inventor.
Howard T. Marshall.
Per Edwin W. Brown.
Attorney.

UNITED STATES PATENT OFFICE.

HOWARD T. MARSHALL, OF BROCKTON, MASSACHUSETTS.

RUBBER-SOLE BOOTS OR SHOES.

SPECIFICATION forming part of Letters Patent No. 437,608, dated September 30, 1890.

Application filed December 27, 1888. Serial No. 294,758. (No specimens.)

*To all whom it may concern:*

Be it known that I, HOWARD T. MARSHALL, of Brockton, in the county of Plymouth and State of Massachusetts, have invented certain new and useful Improvements in Rubber-Sole Boots or Shoes for Yachting and other Purposes, of which the following is a full, clear, and exact description.

Figure 1:
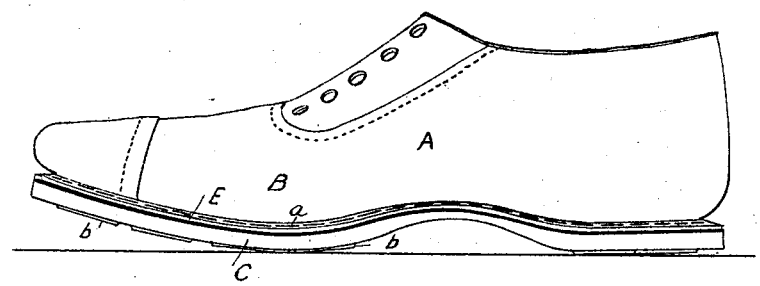
Figure 2:
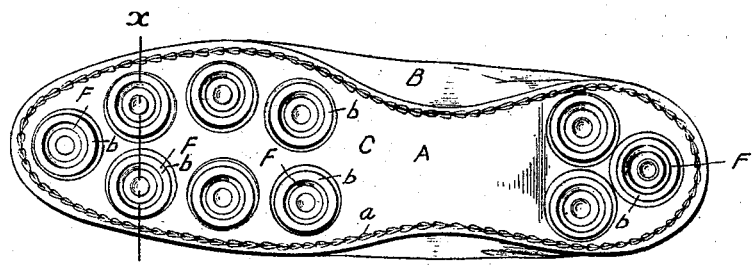
Figure 3:
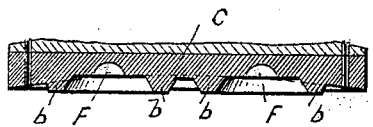

This invention relates to boots or shoes, and has for its object to provide a new and useful rubber sole therefor, as will be more particularly pointed out in the following specification, reference being had to the accompanying drawings, in which—
Figures 1 and 2 are side and bottom plan views, respectively; and Fig. 3, a cross-section on the line $x\ x$, Fig. 2.

In the drawings, A represents a shoe, of which B is the upper, and C the outer sole, the outer sole being secured to the welt E by stitches $a$, and all constructed as usual in the making of boots and shoes, except as to the outer sole, which constitutes the present invention. This outer sole C is made of india-rubber or of india-rubber in any of its compounds, and is molded and vulcanized in the usual manner of molding and vulcanizing articles of india-rubber.

F represents the cavities or depressions in the outer or treading side or surface or portion of the sole. Said cavities or depressions are circular in outline and have raised edges or ribs or rims $b$ around them, which edges or ribs project beyond the treading surface or body of the sole, as shown, making the cavities substantially of a cup shape. The sole on its outer or treading surface is depressed or made more or less concave, as shown in cross-section, Fig. 3, leaving around the edge of the sole a marginal flange or rib K, as shown.

The cavities or depressions and their raised edges or ribs or rims are molded and shaped in the mold when the sole is molded, making the sole complete and finished ready to be applied to the upper.

A more or less number of cavities or depressions can be molded in the sole, and they can be of any suitable shape and form desired—circular, triangular, square, or otherwise—and of any size and depth.

Boots and shoes having soles made as herein described and shown are particularly adapted for use in yachting, as the cavities or depressions cause the sole to the more closely adhere to the smooth surface of the deck of the yacht, because of more or less exhaustion of air from the same, as is obvious.

Having thus described my invention, what I claim is—

A boot or shoe sole of india-rubber or any of its compounds, having its wearing-surface provided with a marginal flange and a series of hollowed projections each consisting of an outer-projecting margin, a central depression, and an intermediate ledge, substantially as described.

In testimony whereof I have hereunto set my hand in the presence of two subscribing witnesses.

HOWARD T. MARSHALL.

Witnesses:
EDWIN W. BROWN,
CARRIE E. NICHOLS.